United States Patent Office 3,712,902
Patented Jan. 23, 1973

3,712,902
TETRAKIS(POLYFLUOROMETHYL)-4-OXAZOLIDINONES
William J. Middleton, Wilmington, Del., assignor to E. I. du Pont de Nemours and Company, Wilmington, Del.
No Drawing. Continuation-in-part of application Ser. No. 636,019, May 4, 1967. This application Aug. 5, 1969, Ser. No. 847,723
The portion of the term of the patent subsequent to Mar. 21, 1984, has been disclaimed and dedicated to the Public
Int. Cl. C07d 85/30, 85/36
U.S. Cl. 260—307 A      4 Claims

ABSTRACT OF THE DISCLOSURE

Described are 4-oxazolidinones having acylic polyhalomethyl substituents containing some fluorine in the 2- and 5-positions, e.g., 2,5-bis(difluoromethyl)-2,5-bis(trifluoromethyl)-4-oxazolidinone. These compounds exhibit strong herbicidal action.

RELATED APPLICATIONS

This application is a continuation-in-part of my coassigned, copending application Ser. No. 636,019, now U.S. Pat. 3,461,129, issued Aug. 12, 1969, filed May 4, 1967, as a division and continuation-in-part of my coassigned and then copending but now abandoned application Ser. No. 555,974, filed June 8, 1966, as a continuation-in-part of my application Ser. No. 435,734, filed Feb. 26, 1965, and now U.S. Pat. 3,310,570. This application is also a continuation-in-part of my copending application Ser. No. 839,054, filed July 3, 1969.

BACKGROUND OF THE INVENTION

(1) Field of the invention

This specification relates to, and has as its principal object provision of, 4-oxazolidinones having fluoromethyl, but not more than three perfluoromethyl, substituents in the 2- and 5-positions, useful as herbicides.

(2) Description of the prior art

My U.S. Pat. 3,310,570 of Mar. 21, 1967, entitled, "Trifluoromethyl-Substituted 4-Oxazolidiones and Their Preparation," discloses and claims 4-oxazolidones having trifluoromethyl substituents in the 2- and 5-positions. The herbicidal utility of the compounds of this application is described and claimed in my copending application Ser. No. 839,054, filed July 3, 1969. The related spiro compounds of my pending application Ser. No. 741,054, filed June 28, 1968, now U.S. Pat. 3,534,050, are useful against the influenza-B virus.

SUMMARY AND DESCRIPTION OF THE INVENTION

The compounds of the present invention have the Formula I:

$$\begin{array}{c} \text{X}^1\text{CF}_2 \\ \phantom{X^2CF_2-}\diagdown 5 \diagup 4 \diagdown 3 \\ \text{X}^2\text{CF}_2-\text{C} \phantom{XXX} \text{N}-\text{A} \\ \phantom{XXX} | \phantom{XX} | \\ \phantom{XXX} \text{O}——\text{C}-\text{CF}_2\text{X}^4 \\ \phantom{XXXXXXX} | \\ \phantom{XXXXXXX} \text{CF}_2\text{X}^3 \end{array} \quad (I)$$

or the tautomeric Formula II:

$$\begin{array}{c} \phantom{XXX} \text{A} \\ \phantom{XXX} | \\ \phantom{XXX} \text{O} \\ \text{X}^1\text{CF}_2 \phantom{X} \text{C} \\ \phantom{X^2CF_2-}\diagdown 5 \diagup 4 \diagdown 3 \\ \text{X}^2\text{CF}_2-\text{C} \phantom{XXX} \text{N} \\ \phantom{XXX} | 1 \phantom{X} | 2 \\ \phantom{XXX} \text{O}——\text{C}-\text{CF}_2\text{X}^4 \\ \phantom{XXXXXXX} | \\ \phantom{XXXXXXX} \text{CF}_2\text{X}^3 \end{array} \quad (II)$$

wherein:

$X^1$, $X^2$, $X^3$ and $X^4$ are alike or different and are hydrogen, fluorine or chlorine, with the proviso that at least one X be other than fluorine; and A is hydrogen, a metal of Group I-A, I-B, II-A, or II-B of the Periodic Table, i.e., Li, Na, K, Rb, Cs, Cu, Ag, Au, Be, Mg, Ca, Sr, Ba, Zn, Cd, or Hg, or ammonium or substituted ammonium, i.e., $NH_4^+$ or $$\begin{array}{c} \text{R}^1 \phantom{X} \text{R}^2 \\ \diagdown \oplus \diagup \\ \text{N} \\ \diagup \phantom{X} \diagdown \\ \text{R}^3 \phantom{XX} \text{R}^4 \end{array}$$

the R's being the same or different and selected from the group consisting of hydrogen, alkyl having 1–4 carbon atoms, and alkyl having 1–4 carbon atoms substituted with one hydroxy group.

Formulae I and II represent extremes of the actual compounds which, when A is H, are mixtures of I and II or some intermediate structure(s). When A is a cation as defined above, there is no formal linkage between said cation and the oxazolidinone which then exists as anion wherein the charge is often represented as distributed over the $$\equiv\text{N}\equiv\text{C}\equiv\text{O}^{\ominus}$$

Thus:

$$\begin{array}{c} \phantom{XXX} \text{O}^{\ominus} \\ \phantom{XXX} | \\ \text{X}^1\text{CF}_2 \phantom{X} \text{C} \\ \text{X}^2\text{CF}_2-\text{C} \phantom{XX} \text{N} \\ \phantom{XXX} | \phantom{XX} | \\ \phantom{XXX} \text{O}——\text{C}-\text{CF}_2\text{X}^4 \\ \phantom{XXXXXXX} | \\ \phantom{XXXXXXX} \text{CF}_2\text{X}^3 \end{array} \quad (III)$$

The well-known reversible-type formula for the structure(s) present may also be used:

$$\begin{array}{cc} \phantom{X}\text{O} & \phantom{X}\text{O}-\text{A} \\ \phantom{X}\| & \phantom{X}\| \\ \text{X}^1\text{CF}_2 \phantom{X}\text{C} & \text{X}^1\text{CF}_2 \phantom{X}\text{C} \\ \text{X}^2\text{CF}_2-\text{C}\phantom{X}\text{N}-\text{A} & \text{X}_2\text{CF}_2-\text{C}\phantom{X}\text{N} \\ \phantom{X}| \phantom{XX}| & \rightleftarrows \phantom{X}| \phantom{XX}| \\ \phantom{X}\text{O}-\text{C}-\text{CF}_2\text{X}^4 & \phantom{X}\text{O}-\text{C}-\text{CF}_2\text{X}^4 \\ \phantom{XXXX}| & \phantom{XXXX}| \\ \phantom{XXXX}\text{CF}_2\text{X}^3 & \phantom{XXXX}\text{CF}_2\text{X}^3 \end{array}$$

The compounds in which A is an alkali metal or quaternary ammonium are prepared by the reaction of at least two molecular equivalents of a polyfluoroacetone with one molecular equivalent of an alkali metal or quaternary ammonium cyanide. A representative reaction can be shown by the equation:

Equation 1

$$2\text{X}^1\text{CF}_2-\text{CO}-\text{CF}_2\text{X}^3 + \text{ACN} \longrightarrow \begin{array}{c} \phantom{XXX} \text{O} \\ \phantom{XXX} \| \\ \text{X}^1\text{CF}_2 \phantom{X} \text{C} \\ \phantom{X^2CF_2}\diagdown \phantom{X} \diagdown \\ \phantom{XX}\text{C}\phantom{XXX}\text{N}^{\ominus}\text{A}^{\oplus} \\ \text{X}^2\text{CF}_2| \\ \phantom{XXX} \text{O}——\text{C}-\text{CF}_2\text{X}^1 \\ \phantom{XXXXXXX} | \\ \phantom{XXXXXXX} \text{CF}_2\text{X}^2 \end{array}$$

where A is an alkali metal or quaternary ammonium cation in which the alkyl groups have up to 4 carbons, such as tetraethylammonium and tetrabutylammonium.

This reaction can be conducted either without solvent or in the presence of a solvent or an inert reaction medium such as a carbonitrile, ether, or hydrocarbon. A preferred action medium is acetonitrile. The temperature is not critical, and can be as low as −100° or as high as 100° C. The preferred temperature range is from −80 to 70° C. Time and pressure are also not critical. The salt need not be isolated from the reaction mixture prior to further reaction with acids. However, the salt can be isolated, if desired, by evaporation of the reaction mixture to dryness.

Mixtures of polyfluoroketones yield mixtures of oxazolidinones, e.g.:

Equation 2

$X^1CF_2-CO-CF_2X^2 + X^3CF_2CO-CF_2X^4 + ACN \longrightarrow$

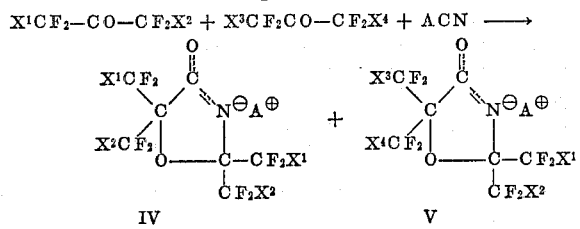

This reaction is described in detail for the preparation of 2,2,5,5-tetrakis(trifluoromethyl) - 4 - oxazolidinone in my above-mentioned U.S. Pat. 3,310,570, the disclosure of which is incorporated herein by reference.

The compounds of this invention in which A is other than hydrogen, i.e., salts, can also be prepared by reaction of a compound where A is hydrogen, i.e., hydrogen compounds, with an alkali metal or alkaline earth metal alkoxide, hydroxide or carbonate or with ammonia or an amine. Alternatively, those compounds in which A is sodium ion can be prepared by eliminating the acidification steps from the above reaction sequence of Equation 1. This latter procedure is also described in U.S. Pat. 3,310,570.

The salts of the 4-oxazolidones can also be prepared by metathesis of the alkali metal salts. For example, the addition of an acetonitrile solution of silver nitrate to an acetonitrile solution of the sodium salt of 2,2,5,5-tetrakis(trifluoromethyl)-4-oxazolidone at ordinary room temperature results in the precipitation of sodium nitrate leaving the desired silver salt of the 4-oxazolidone in solution. On removal of the precipitated sodium salt by filtration, the silver salt can be isolated by distillation of the solvent.

In addition to the position isomers shown in Formulae IV and V, the compounds of this invention can exist in more than one steroisomeric form. The structure of Formula I as depicted is used for brevity, but it is to be understood that is invention includes all steroisomeric variations of Formulae I and II.

EMBODIMENTS OF THE INVENTION

The following examples are illustrative of the compounds of this invention and of the methods by which they can be prepared. Parts and percentages are by weight unless otherwise specified. In some examples, both parts by weight and parts by volume appear. Where the equations given stop at salt formation, the hydrogen compound is obviously formed by the addition of HCl.

EXAMPLE 1

Preparation of 2,5-bis(difluoromethyl)-2,5-bis(trifluoromethyl)-4-oxazolidinone, cis-trans mixture $(X^1=X^3=A=H; X^2=X^4=F)$ $2HCF_2\overset{O}{\underset{\parallel}{C}}CF_3 + NaCN \longrightarrow$

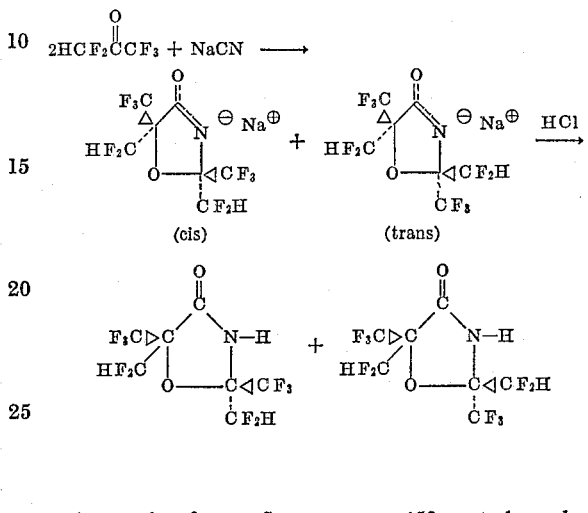

A sample of pentafluoroacetone (50 parts by volume, measured at −78° C.) is slowly distilled into a stirred suspension of 13.44 parts of powdered sodium cyanide in 157 parts of acetonitrile. The reaction mixture is held at −30° C. during the addition (which requires about 1 hour) and for another hour; the temperature is then allowed to come to 25° C. overnight. The colorless solution is added to 200 ml. of 10% HCl and shaken. The lower organic layer is separated and washed four times with water (about 1¾ liter total volume) to remove acetonitrile. On the fourth washing, the product precipitates and is filtered and washed with water. The white crystalline solid is purified by recrystallization from benzene-hexane and by sublimation to give 78 parts of white crystalline 2,5 - bis(difluoromethyl) - 2,5 - bis(trifluoromethyl)-4-oxazolidinone; M.P. 93–94° C. (sublimed); 91.5–93° C. (recrystallized). The product is identified by hydrogen and fluorine nuclear magnetic resonance spectroscopy, infrared analysis, and elemental analysis.

EXAMPLE 2

Separation of the cis and trans isomers of 2,5-bis(difluoromethyl)-2,5-bis(trifluoromethyl)-4-oxazolidinone Approximately equal amounts of the pure cis and trans isomers are obtained by gas chromatographic separation on an 8-ft. column of 25% fluorosilicone on "Chromosorb" W at 100° C. The following data are obtained for the two isomers:

(1) (Shorter retention time)

$1_H$ NMR (DMSO-$d_6$): −0.2τ (multiplet, 1H); triplets centered at 3.14τ and 3.38τ (J=51, Hz, 2H).
$19_F$ NMR (DMSO-$d_6$, CCl$_3$F internal standard): 72.9 p.p.m. (multiplet, 3F); 78.4 p.p.m. (multiplet, 3F); 133 p.p.m. (multiplet, 4F).

(2) (Longer retention time)

M.P. 93–94° C.
$1_H$ NMR (DMSO-$d_6$): triplets centered at 3.19 and 3.38τ (J=51 Hz, 2H); N–H proton not detected in 500 Hz. scan.
$19_F$ NMR (DMSO-$d_6$, CCl$_3$F internal standard): 72.6 p.p.m. (quintet, J=9 Hz, 3F); 77.9 p.p.m. (2 overlapping quartets, J$_1$=9 Hz., J$_2$=13 Hz., 3F); 133 p.p.m. (multiplet, 4F).

EXAMPLE 3

Preparation of 2,2,5,5-tetrakis(difluoromethyl)-4-oxazolidinone ($X^1=X^2=X^3=X^4=A=H$)

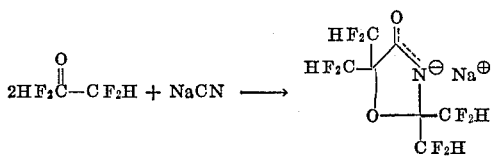

A sample of s-tetrafluoroacetone (65 parts) is added portionwise during a 1-hour period of to a suspension of 12.5 parts of powdered sodium cyanide in 78 parts of acetonitrile. The temperature is maintained below 40° C. by cooling in an ice bath. After the addition, the mixture is stirred for 30 minutes, and then poured into 500 parts of water containing 68 parts of concentrated hydrochloric acid. The oily layer that separates is washed with water and dissolved in aqueous 5% sodium hydroxide. This solution is filtered to remove undissolved material and then acidified with aqueous 5% hydrochloric acid. The solid that preciptates is collected on a filter, washed with water, and recrystallized from benzene to give 16.1 parts of the oxazolidinone as colorless needles, M.P. 122–124° C. Sublimation at 120° C. (5 mm.) gives a purer product: M.P. 123–125° C.

*Analysis.*—Calcd. for $C_7H_5F_8NO_2$ (percent): C, 29.28; H, 1.76; F, 52.96; N, 4.88. Found (percent): C, 29.80; H, 1.90; F, 52.46; N, 4.61.

EXAMPLE 4

Preparation of 2-difluoromethyl-2,5,5-tris(trifluoromethyl)-4-oxazolidinone ($X^1=A=H$; $X^2=X^3=X^4=F$)

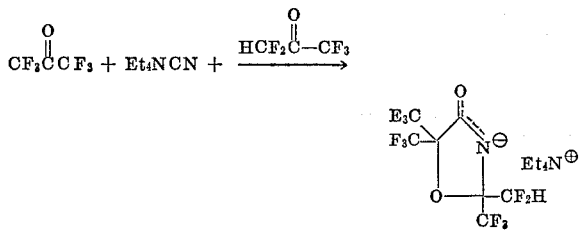

Hexafluoroacetone, 5.5 parts by volume, is distilled into a solution of 7.8 parts of tetraethylammonium cyanide in 39 parts of acetonitrile cooled to −20° C. Pentafluoroacetone, 6 parts by volume, is then distilled into the reaction mixture at −20° C. The reaction mixture is stirred at 25° C. for 18 hours, poured into 100 parts of water, and acidified with concentrated hydrochloric acid. The organic layer is separated, dried over anhydrous magnesium sulfate and allowed to evaporate at room temperature until crystals form. The crystals are collected on a filter, recrystallized from benzene, sublimed at 135° C. (2 mm.), and resublimed at 120° C. (2 mm.) to give 8.26 parts (40% yield) of 2-difluoromethyl-2,5,5-tris(trifluoromethyl)-4-oxazolidinone; M.P. 100–101° C.

*Analysis.*—Calcd. for $C_7F_{11}H_2NO_2$ (percent): C, 24.65; H, 0.59; F, 61.27; N, 4.11. Found (percent): C, 25.38; H, 1.12; F, 60.98; N, 4.88.

EXAMPLE 5

Preparation of 2,5-bis(chlorodifluoromethyl)-2,5-bis-(difluoromethyl)-4-oxazolidinone ($X^1=X^3=Cl$; $X^2=X^4=A=H$)

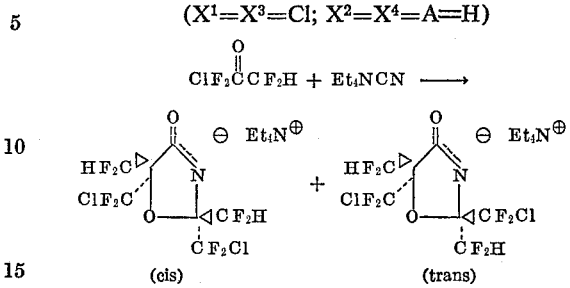

A sample of 1-chloro-1,1,3,3-tetrafluoroacetone (46 parts) is added dropwise to a stirred solution of 21.45 parts of tetraethylammonium cyanide in 78 parts of acetonitrile at −30° C. After the addition, which requires about 20 minutes, the solution is stirred at −30° C. for 1.5 hours, then brought to room temperature over a period of 1 hour. The solution is poured into 100 ml. of 10% HCl solution, shaken, and the lower organic phase is separated and washed four times with water to remove acetonitrile. The viscous organic layer is diluted with ether and dried over $MgSO_4$, and the solvent is removed by distillation. The crude product is distilled (B.P. 88–100° C. at 1.8 mm.). The nearly colorless distillate solidifies on cooling and is further purified by sublimation. A white solid (6.3 parts) is obtained: M.P. 33–36° C.

*Analysis.*—Calcd. for $C_7H_3O_2NCl_2F_8$ (percent): C, 23.61; H, 0.85; N, 3.94. Found (percent): C, 23.90; H, 0.90; N, 3.89.

EXAMPLE 6

2,5-bis(chlorodifluoromethyl)-2,5-bis(trifluoromethyl)-4-oxazolidinone ($X^1=X^3=Cl$; $X^2=X^4=F$; $A=H$)

(A)

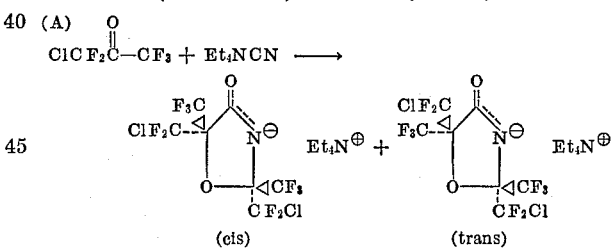

A sample of chloropentafluoroacetone (25 parts by volume) is slowly distilled into a stirred solution of 15.6 parts of tetraethylammonium cyanide in 157 parts of acetonitrile. Cooling is applied to keep the reaction temperature between 20–30° C. The reaction mixture is stirred overnight and then acidified with 200 parts of 10% hydrochloric acid. The organic layer is separated and washed several times until it becomes very viscous. It is then dissolved in 100 parts of 5% sodium hydroxide and reprecipitated by addition of 100 parts of 10% hydrochloric acid. The solid that forms upon standing is recrystallized from pentane and then sublimed at 80° C. (10 mm.) to give 11.9 parts of the oxazolidinone as colorless crystals: M.P. 87–89° C.

*Analysis.*—Calcd. for $C_7HCl_2F_{10}NO_2$ (percent): C, 21.45; H, 0.26; Cl, 18.09; F, 48.87; N, 3.57. Found (percent): C, 21.53; H, 0.33; Cl, 17.99; F, 48.43; N, 3.45.

B)

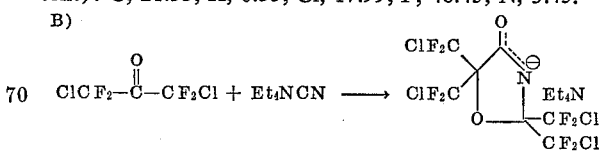

By replacing the chloropentafluoroacetone of the above example with an equivalent amount of s-dichlorotetrafluoroacetone, 2,2,5,5-tetrakis(chlorodifluoromethyl)-4- oxazolidinone is prepared ($X^1=X^2=X^3=X^4=Cl$; $A=Et_4N$).

EXAMPLE 7

Preparation of 2,5-bis(difluoromethyl)-2,5-bis-(trifluoromethyl)-4-oxazolidinone, sodium salt Fifteen parts of 2,5-bis(difluoromethyl)-2,5-bis(trifluoromethyl)-4-oxazolidinone is dissolved in 7.92 parts of methanol. A solution of 2.61 parts of sodium methoxide in 119 parts of methanol is added with stirring, and the methanol evaporated in an air stream. The sticky residue is vacuum-dried, triturated with a small amount of warm benzene, filtered to remove traces of unconverted oxazolidinone, and air-dried, leaving the sodium salt of 2,5-bis-(difluoromethyl) - 2,5 - bis(trifluoromethyl - 4 - oxazolidinone, which can be formulated and applied as described hereinafter.

EXAMPLE 8

Preparation of 2,2,5,5-tetrakis(difluoromethyl)-4-oxazolidinone, potassium salt

To 31 parts of 2,2,5,5-tetrakis(difluoromethyl)-4-oxazolidinone in 200 parts of water is added 100 parts by volume of 1.0 N aqueous potassium hydroxide. The resulting solution is evaporated to dryness leaving as a solid, the potassium salt of 2,2,5,5-tetrakis(difluoromethyl)-4-oxazolidinone.

The following salts can be prepared by replacing the 2,2,5,5-tetrakis(difluoromethyl)-4-oxazolidinone and potassium hydroxide of Example 8 with equivalent amounts of the oxazolidinones and bases shown below in Table I.

TABLE I

| Example | Oxazolidinone | Base | Salt product |
|---|---|---|---|
| 9 | 2,2,5,5-tetrakis(difluoromethyl)-4-oxazolidinone | Dimethylamine | 2,2,5,5-tetrakis(difluoromethyl)-4-oxazolidinone, dimethylammonium salt. |
| 10 | do | Calcium hydroxide | 2,2,5,5-tetrakis(difluoromethyl)-4-oxazolidinone, calcium salt. |
| 11 | do | Sodium carbonate | 2,2,5,5-tetrakis(difluoromethyl)-4-oxazolidinone, sodium salt. |
| 12 | 2,5-bis(difluoromethyl)-2,5-bis(trifluoromethyl)-4-oxazolidinone | Triethanolamine | 2,5-bis(difluoromethyl)-2,5-bis(trifluoromethyl)-4-oxazolidinone, triethanolammonium salt. |
| 13 | do | Barium hydroxide | 2,5-bis(difluoromethyl)-2,5-bis(trifluoromethyl)-4-oxazolidinone, barium salt. |
| 14 | do | Methylamine | 2,5-bis(difluoromethyl)-2,5-bis(trifluoromethyl)-4-oxazolidinone, methylammonium salt. |
| 15 | 2,5-bis(chlorodifluoromethyl)-2,5-bis(trifluoromethyl)-4-oxazolidinone | Ammonia | 2,5-bis(chlorodifluoromethyl)-2,5-bis(trifluoromethyl)-4-oxazolidinone, ammonium salt. |

Substitution of the polyfluoroketone(s) in columns 1 and 2 in the rocedure of Example 3 yields the oxazolidinone(s) shown in column 3 of Table II:

TABLE II

| Example | Column 1 | Column 2 | Column 3 |
|---|---|---|---|
| 16 | $ClCF_2COCF_2Cl$ | | [Structure: oxazolidinone with $ClF_2C$, $ClF_2C$ at 2-position; $CF_2Cl$, $CF_2Cl$ at 5-position; $Na^{\oplus}$, $N^{\ominus}$] |
| 17 | $ClCF_2COCF_2Cl$ | $HCF_2COCF_3$ | [Structure 1: $ClF_2C$, $ClF_2C$ at 2-position; $CF_3$, $CF_2H$ at 5-position] plus [Structure 2: $F_3C$, $HF_2C$ at 2-position; $CF_2Cl$, $CF_2Cl$ at 5-position] |
| 18 | $HCF_2COCF_2H$ | $ClCF_2COCF_2Cl$ | [Structure 1: $HF_2C$, $HF_2C$ at 2-position; $CF_2Cl$, $CF_2Cl$ at 5-position] plus [Structure 2: $ClF_2C$, $ClF_2C$ at 2-position; $CF_2H$, $CF_2H$ at 5-position] |
| 19 | $HCF_2COCF_2H$ | $HCF_2COCF_3$ | [Structure 1: $HF_2C$, $HF_2C$ at 2-position; $CF_3$, $CF_2H$ at 5-position] plus [Structure 2: $F_3C$, $HF_2C$ at 2-position; $CF_2H$, $CF_2H$ at 5-position] |
| 20 | $HCF_2COCF_2H$ | $ClCF_2COCF_3$ | [Structure 1: $HF_2C$, $HF_2C$ at 2-position; $CF_2Cl$, $CF_3$ at 5-position] plus [Structure 2: $ClF_2C$, $F_3C$ at 2-position; $CF_2H$, $CF_2H$ at 5-position] |
| 21 | $HCF_2COCF_2H$ | $CF_3COCF_3$ | [Structure 1: $HF_2C$, $HF_2C$ at 2-position; $CF_3$, $CF_3$ at 5-position] plus [Structure 2: $F_3C$, $F_3C$ at 2-position; $CF_2H$, $CF_2H$ at 5-position] |

TABLE II—Continued

| Example | Column 1 | Column 2 | Column 3 |
|---|---|---|---|
| 22 | $HCF_2COCF_2H$ | $HCF_2COCF_2Cl$ | (structure) Na⊕ salt of 2-chlorodifluoromethyl-5-difluoromethyl-2,5-bis(difluoromethyl)-4-oxazolidinone plus Na⊕ salt of 2-chlorodifluoromethyl-2,5,5-tris(difluoromethyl)-4-oxazolidinone |
| 23 | $HCF_2COCF_3$ | $ClCF_2COCF_3$ | Na⊕ salt of 2-chlorodifluoromethyl-2,5-bis(trifluoromethyl)-5-difluoromethyl-4-oxazolidinone plus Na⊕ salt of 2-chlorodifluoromethyl-5,5-bis(trifluoromethyl)-2-difluoromethyl-4-oxazolidinone |
| 24 | $HCF_2COCF_3$ | $ClCF_2COCF_2Cl$ | Na⊕ salt (chloro/fluoro substituted oxazolidinones) plus Na⊕ salt of related isomer |
| 25 | $HCF_2COCF_3$ | $HCF_2COCF_2Cl$ | Na⊕ salt plus Na⊕ salt of related compound |
| 26 | $ClCF_2COCF_3$ | $ClCF_2COCF_2Cl$ | Na⊕ salt plus Na⊕ salt of related compound |

UTILITY

The salts of this invention are useful as flame-proofing agents for paper and textile products. For example, solutions of metal or quaternary ammonium salts in acetonitrile can be used to impregnate paper or cellulosic fabrics with the salt to reduce their flammability.

All the oxazolidinones of this invention are useful as herbicides, and such utility is specifically claimed in my copending application Ser. No. 839,054 of which this is a continuation-in-part. The disclosure of this copending application is specifically incorporated herein by reference.

There follow some examples showing the use of compounds of this invention for herbicidal purposes:

EXAMPLE A

Percent (wt.)
2,5-bis(difluoromethyl) - 2,5 - bis(trifluoromethyl)-
4-oxazolidinone _____ 50
Partially desulfonated sodium lignosulfonate _____ 3
Dicotyl sodium sulfosuccinate _____ 1.5
Kaolin _____ 45.5

The above ingredients are blended and hammer milled until essentially all particles of active ingredient are 50 microns or less. The resultant herbicidal composition is used to control weeds in orchards (citrus, apples, peaches and pecans) and vineyards. It is suspended in sufficient water to allow uniform spray application at the rate of 4.5 kilograms of active ingredient per hectare. Only orchards or vineyards established 2 or more years are treated. Care is taken to avoid contact with crop foliage or bark. Pre-emergence application controls common weeds such as crabgrass, giant foxtail, cheat, pigweed and nutsedge.

EXAMPLE B

Percent (wt.)
2 - difluoromethyl - 2,5,5 - tris(trifluoromethyl) - 4-
oxazolidinone _____ 25
Oleic acid ester of sodium isethionate _____ 3
Polyethoxylated nonylphenol _____ 1
Diatomaceous silica _____ 71

The above ingredients are blended and micropulverized until essentially all particles of the active component are 50 microns or less.

The above herbicides provides long-term control of weeds on industrial sites (around storage tanks, pipelines, rights-of-way, etc.) when applied at the rate of 13.5 kilograms of active ingredient per hectare. Application is made in sufficient water to allow uniform coverage of the soil surface. Pre-emergence treatment controls crabgrass, goosegrass, morning-glory, ragweed, pigweed, nutsedge and certain other weeds.

EXAMPLE C

Percent (wt.)
2,2,5,5-tetrakis(difluoromethyl)-4-oxazolidinone ____ 95
Partially desulfonated sodium lignosulfonate _____ 3
Dioctyl sodium sulfosuccinate _____ 1
Finely divided silica _____ 1

The above ingredients are blended and hammer milled until essentially all particles of active ingredient are 50 microns or less.

Nutsedge and certain annual weeds are controlled in fallow land with 4.5 kilograms of active ingredient per hectare of the above compound. Applied to clean soil or incorporated, by disking, the herbicide provides weed control several weeks, reducing the need for mechanical weed control while a crop is not being grown. The chemical is applied in sufficient volume of water to obtain uniform application (250 to 450 liters per hectare).

What is claimed is:

1. A compound of the formula

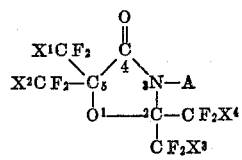

wherein:
$X^1$, $X^2$, $X^3$ and $X^4$ are alike or different and are hydrogen, fluorine or chlorine, with the proviso that at least one X be other than fluorine; and
A is hydrogen, Na, or K.

2. The compound of claim 1 wherein $X^1=X^3=A=H$ and $X^2=X^4=F$: 2,5-bis(difluoromethyl)-2,5-bis(trifluoromethyl)-4-oxazolidinone.

3. The compound of claim 1 wherein $$X^1=X^2=X^3=X^4=Cl$$

and A=H: 2,2,5,5-tetrakis(chlorodifluoromethyl)-4-oxazolidinone.

4. The sodium salt of the compound of claim 1: 2,2,5,5-tetrakis(difluoromethyl)-4-oxazolidinone.

References Cited

UNITED STATES PATENTS 3,310,570    3/1967    Middleton _____ 260—307
3,461,129    8/1969    Middleton _____ 260—307

ALTON D. ROLLINS, Primary Examiner

U.S. Cl. X.R.

71—88; 117—136; 162—159; 252—8.1; 260—299, 307 F, 593 H